United States Patent [19]

Castelli et al.

[11] Patent Number: 4,468,984
[45] Date of Patent: Sep. 4, 1984

[54] EPICYCLIC TRANSMISSION

[75] Inventors: Pier Guido Castelli, Turin; Giorgio Lupo, Rivalta; Diego Burla, Bruino, all of Italy

[73] Assignee: Centro Ricerche Fiat S.p.A., Orbassano, Italy

[21] Appl. No.: 354,268

[22] Filed: Mar. 3, 1982

[51] Int. Cl.³ .................... F16H 15/50; F16H 15/16; F16H 55/34
[52] U.S. Cl. ........................ 74/796; 74/191; 74/192; 74/216
[58] Field of Search ............... 74/796, 216, 191, 793, 74/690, 467; 308/207 R, 215

[56] References Cited

U.S. PATENT DOCUMENTS

| | | | |
|---|---|---|---|
| 2,209,023 | 7/1940 | Jett | 74/191 X |
| 2,328,536 | 9/1943 | Bade | 74/796 X |
| 2,342,071 | 2/1944 | Bade | 74/796 X |
| 2,343,840 | 3/1944 | Bade | 74/796 |
| 2,642,749 | 5/1953 | Wood | 74/191 |
| 3,357,277 | 12/1967 | Alsch | 74/796 |
| 3,677,109 | 7/1972 | Stuemky | 74/796 |
| 4,233,851 | 11/1980 | Kemper | 74/191 |
| 4,282,774 | 8/1981 | van der Lely | 74/191 X |
| 4,378,708 | 4/1983 | Pouliot | 74/191 |

FOREIGN PATENT DOCUMENTS 405647 3/1934 United Kingdom .

*Primary Examiner*—Allan D. Herrmann
*Assistant Examiner*—Bruce F. Wojciechowski
*Attorney, Agent, or Firm*—Sughrue, Mion, Zinn, Macpeak & Seas

[57] ABSTRACT

An epicyclic transmission with steplessly-variable speed control includes a set of three planet wheels (46) which are in the form of tapered rollers of dual conicity and are supported for rotation by a planet carrier (34) driven by a drive shaft (28). The tapered planet wheels have a larger frusto-conical portion (48) in rolling contact with a governing annulus (58) which is locked for rotation and is displaceable axially, and a smaller frusto-conical portion (50) associated with a driven annulus (92) which rotates a driven shaft (102). The tapered planet wheels also have two axially-spaced bearing surfaces (52,54) in rolling contact with two corresponding bearing surfaces (136,138) of a freely-rotatable sun wheel in the form of a sleeve (122) coaxial with the drive shaft (FIG. 1).

13 Claims, 4 Drawing Figures

EPICYCLIC TRANSMISSION

FIELD OF THE INVENTION

The present invention relates to an epicyclic transmission with steplessly-variable speed control including:
- a housing;
- a drive shaft and a driven shaft extending within the housing;
- a planet carrier within the housing mounted on the drive shaft for rotation by the latter;
- a plurality of planet wheels in the form of tapered rollers which are supported for rotation by the planet carrier by means of rolling bearings and are spaced angularly from one another about the axis of rotation of the planet carrier, the planet wheels having a larger frusto-conical portion and a smaller frusto-conical portion adjacent the larger base of the larger frusto-conical portion, and the radially external generatrices of the larger frusto-conical portions extending substantially parallel to the axis of rotation of the planet carrier;
- a governing annulus locked for rotation with the housing and having its internal surface in rolling contact with the surfaces of the larger frusto-conical portions of the tapered planet wheels;
- adjustment means for axial displacement of the governing annulus along the larger conical portions of the tapered planet wheels;
- a driven annulus rotatable coaxially with the planet carrier and having an internal conical surface complementary to the surfaces of the smaller frusto-conical portions of the tapered planet wheels, the driven annulus rotating the driven shaft, and
- means for pressing together into pressure contact the surfaces of the smaller frusto-conical portions of the tapered planet gears and the complementary conical surface of the driven annulus, and the surfaces of the larger frusto-conical portions of the tapered planet wheels and the internal surface of the governing annulus.

THE PRIOR ART

Transmissions of the type defined above are described and illustrated, for example, in U.S. Pat. No. 2,328,536, U.S. Pat. No. 2,343,840, U.S. Pat. No. 2,342,071 and U.S. Pat. No. 3,677,109.

These transmissions, generally referred to as "Traction Drive" transmissions, are based on the elasto-hydrodynamic theory of lubrication and, for transmitting power, take advantage of the shearing strength of a lubricant film between the surfaces of the components of the transmission that are in rolling contact. In fact, when subjected to high working pressures, the lubricant film undergoes a vitreous transition to behave like a solid, thus retaining a constant thickness which is also due to the elastic yield of the material forming the members that are in rolling contact, its shearing strength enabling transmission of the drive forces from the drive member to the driven member whilst ensuring complete separation between the surface irregularities of these members.

The main problem with these transmissions is the difficulty of transmitting high power when the size and bulk are reduced, as necessary for application to the field of motor traction. These difficulties arise mainly from the magnitude of the normal forces acting on the surfaces of the members in rolling contact. In order to ensure transmission of the high torques involved, these forces assume the value of several tons and impose considerable loads on the support bearings of the tapered planet wheels, with the result that the working life of the transmission is by no means satisfactory. These forces also cause deformation of the members in rolling contact which, combined with tolerances of size and assembly, jeopardises the concentricity of the epicyclic unit to the point where the tapered planet wheels operate on kinematically differing contact radii, causing variability in the transmission ratio, overloading of the contact areas, slippage and wear.

Given the heavy loads involved, it is therefore essential that geometric causes of wear are eliminated as far as possible, whilst ensuring correct and constant lubrication of the contact areas in order to avoid an interruption of the lubricant film and any resultant direct contact between the metal parts.

A further drawback in the transmissions of the prior art lies in the complexity and inadequacy of the adjustment means for axial displacement of the governing annulus, and the devices which together hold the planet wheels in pressure contact with the driven annulus, and the planet wheels with the governing annulus; that is to say, a lack of operational reliability.

OBJECT OF THE INVENTION

The general object of the present invention is to avoid the drawbacks of the prior art and, in particular, to produce a transmission with a steplessly-variable speed control, of the type mentioned initially, which is capable of transmitting high rates of power and torque with reduced size and bulk, and which proves operationally reliable with a long working life, so that it may be applied efficiently in the field of motor traction.

THE INVENTION

The invention achieves its aim by means of a transmission with steplessly-variable speed control of the type defined above, the main characteristic of which lies in the fact that it further includes a freely-rotatable sun wheel in the form of a sleeve which is coaxial with the planet carrier and has two axially-spaced bearing surfaces in rolling contact with two complementary bearing surfaces of each of the tapered planet wheels.

Due to this characteristic, each of the tapered planet wheels has two linear fatigue-bearing areas by virtue of which there is an appreciable reduction in the loads to which the bearings are subjected when they support the rotating tapered planet wheels, leaving them with the sole function of bearing the tilting torque arising from the tangential forces in the drive contacts of the planet wheels. These linear bearing areas enable the hertzian contact pressures to be contained within limits which ensure an acceptable fatigue life for the transmission.

According to the invention, the contact areas between the two bearing surfaces of the sun wheel sleeve and the two complementary bearing surfaces of each tapered planet wheel lie on common conical generatrices which converge substantially towards the point of intersection between the rotation axes of the tapered planet wheels and the rotation axis of the planet carrier.

The rolling contact between the tapered planet wheels and the sun wheel sleeve thus remains kinematically correct and free from dissipative spin phenomena.

According to another aspect of the invention, the means for pressing together into pressure contact the smaller frusto-conical portions of the tapered planet wheels and the complementary conical surface of the driven annulus, and the larger frusto-conical portions of the tapered planet wheels and the internal surface of the governing annulus, as well as the adjustment means for axial displacement of the governing annulus along the larger conical section of the tapered planet wheels, are formed by oleodynamic actuators.

This characteristic facilitates automatic control of the transmission in a simple and functional manner using, for example, an electronic control unit, so that the transmission itself may be adapted instantly to the operating requirements both insofar as this relates to variations in the transmission ratio between the drive shaft and the driven shaft, and to the variation in contact pressure between the tapered planet wheels and the driven annulus and governing annulus, respectively, as a function of the values of the torques to be transmitted and the rate of rotation of the transmission.

Further characteristics of the transmission according to the invention lie in the ability of the components of the transmission itself to self-centre under load, thereby eliminating any operational difficulties arising from operating tolerances and any play which might develop in assembly or under load, and in a lubrication system which can continuously supply a liquid lubricant under pressure to the contact areas between the tapered planet wheels and the governing annulus, the driven annulus, and the sun wheel sleeve respectively, and to the bearings which support the rotating members of the transmission during rotation.

DESCRIPTION OF A PREFERRED EMBODIMENT OF THE INVENTION

The invention will now be described with reference to the attached drawings which, purely by way of non-limiting example, illustrate a preferred embodiment of the invention.

Figure 1:
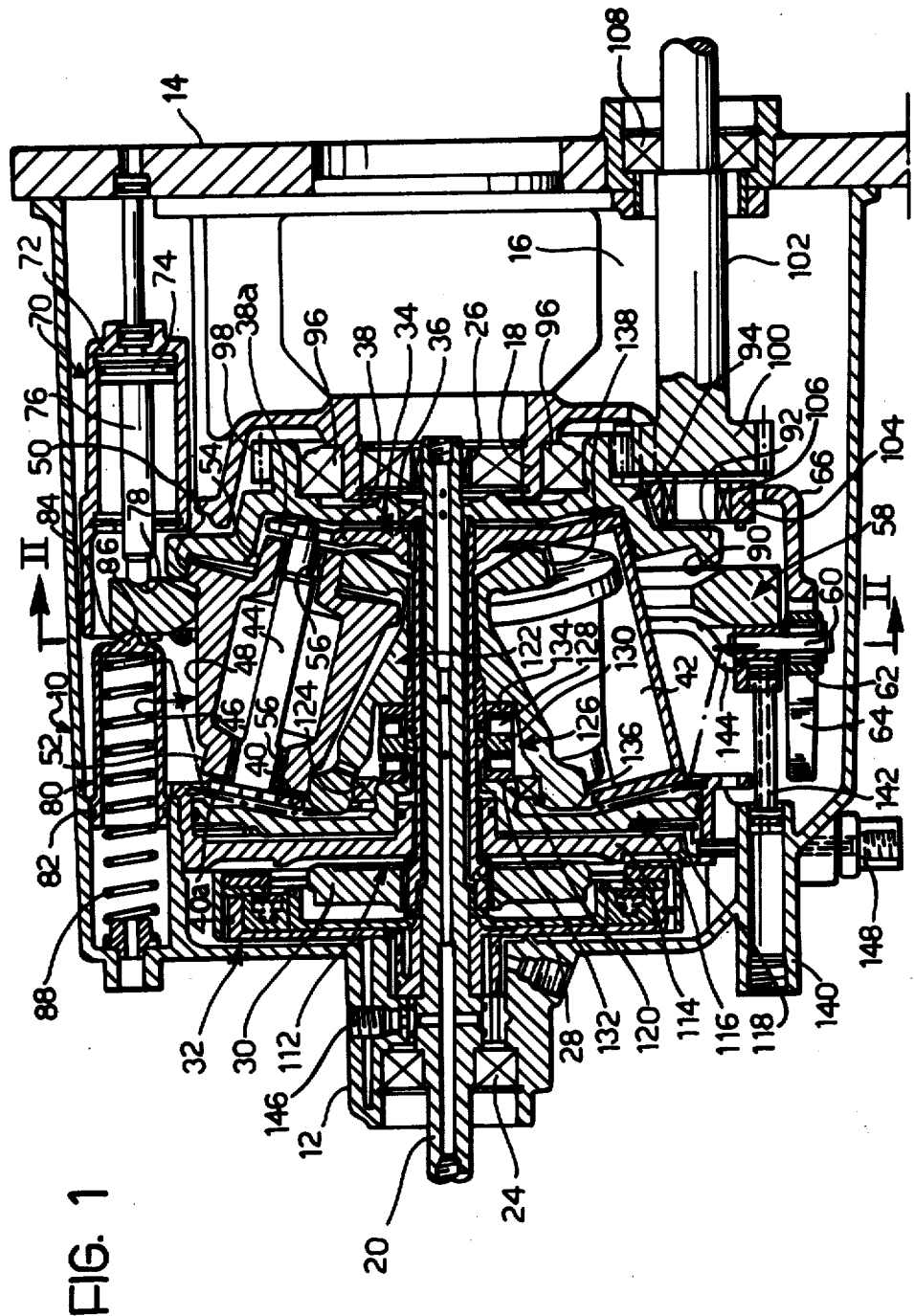
FIG. 1 is an axial section taken along the line I—I in FIG. 2, showing a transmission according to the invention.
Figure 2:
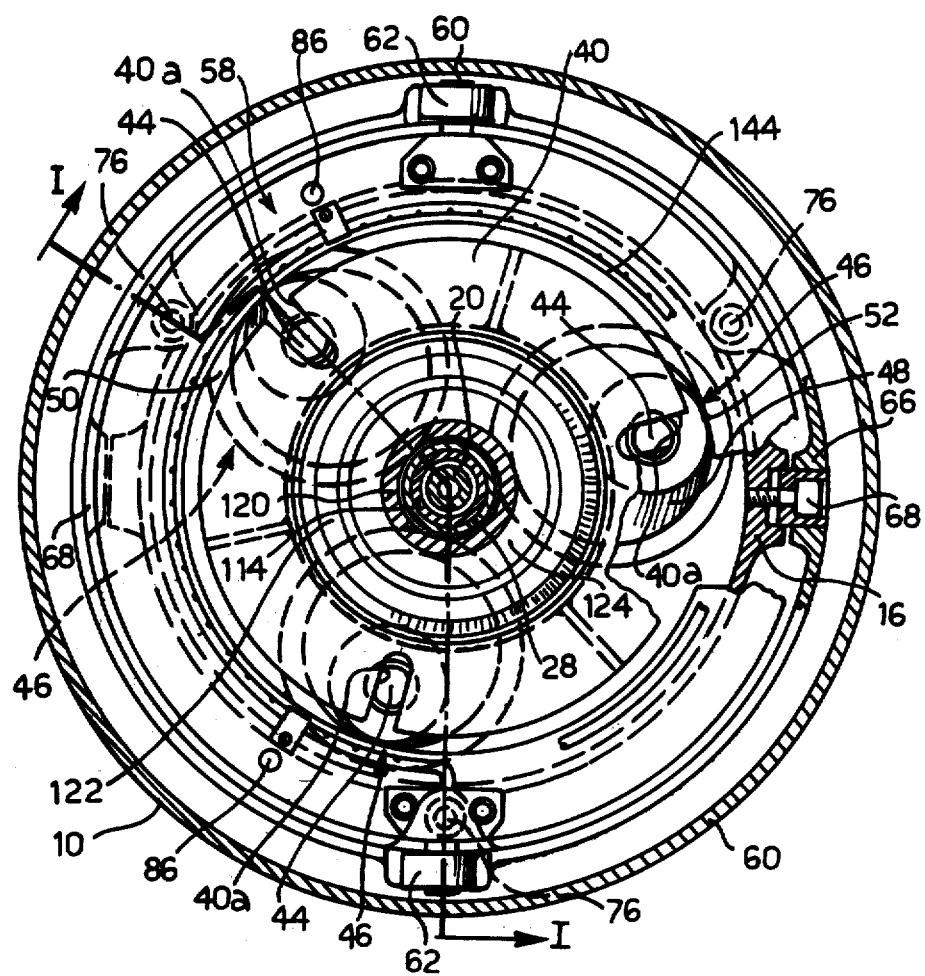
FIG. 2 is a transverse section taken along the line II—II of FIG. 1.

Referring to FIGS. 1 and 2, a substantially cylindrical housing 10 has a tubular projection 12 at one end and is closed by a plate 14 at the opposite end. A hollow support body 16 is fixed to the internal face of plate 14, having a tubular projection 18 at its inner end which is coaxial with the tubular projection 12.

A hollow input shaft 20 extends through the housing 10 and is arranged to be driven by the shaft of a motor vehicle engine. The input shaft 20 is support for rotation on one side by the tubular projection 12 and on the opposite side by the tubular projection 18, by means of roller bearings indicated 24, 26 respectively.

A drive shaft 28 surrounds coaxially, and in a rotatable manner, the central part of input shaft 20. That end of the drive shaft 28 which faces the tubular projection 12 is connected with an axially sliding disc 30 associated with a hydraulically-operated friction clutch 32 of known type, which has the function of coupling or uncoupling the drive shaft 28 and the input shaft 20 during rotation.

A planet carrier 34 is fitted by means of a splined coupling 36 onto the other end of the drive shaft 28. The planet carrier 34 is formed by a rear disc 38 and a front disc 40 interconnected by means of a septa 42 which are angularly equidistant with respect to the drive shaft 28. In the areas between the connecting septa 42, the rear and front disc 38,40 are provided with two sets of three mutually-aligned radial notches 38a, 40a. The end of a pin 44 is slidingly engaged in each corresponding pair of notches 38a, 40a and on it is mounted a freely-rotatable planet wheel in the form of a tapered roller 46. As shown in detail in FIG. 3, the axes of the pins 44, that is, the rotation axes of the three tapered planet wheels 46, converge towards the rear of the housing 10 at a point C lying on the rotation axis of the planet carrier 34, or the shafts 20,28.

Figure 3:
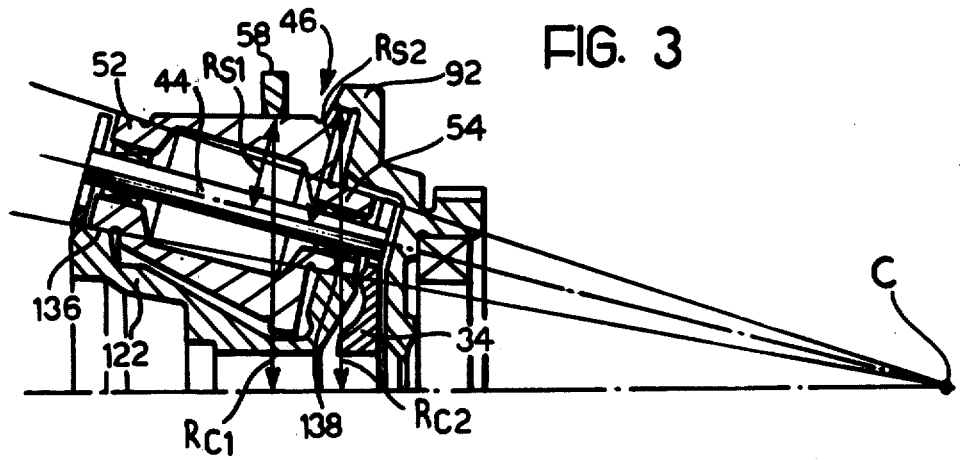
FIG. 3 is a diagrammatic view of a detail of FIG. 1.

Each tapered planet wheel 46 is hollow in order to minimize the effect of centrifugal force during operation, and has a larger frusto-conical portion 48, a smaller frusto-conical portion 50 formed by an annular projection adjacent the larger base of the larger frusto-conical portion 48, and two terminal tangs with cylindrical internal surfaces and conical external surfaces at the front 54 and rear 52 respectively. The larger frusto-conical portion 48 converges towards the front of the housing 10, whilst the smaller frusto-conical portion 50 and the conical surfaces of the terminal tangs 52, 54 converge towards the rear of the housing 10. More particularly, as shown in FIG. 3, the conical surfaces of the terminal tangs 52, 54 have common generatrices converging towards the point C, towards which, as stated previously, the rotation axes of the tapered planet wheels 40 converge.

Each planet wheel 46 is mounted rotatably on its respective pins 44 by a pair of radial roller bearings between the internal surfaces of the terminal tangs 52, 54 and the corresponding parts of the pins 44.

The radially external generatrices of the larger frusto-conical portions 48 of the planet wheels 46 are arranged on an imaginary common cylindrical surface concentric with the axis of rotation of the planet carrier 34. The surfaces of these larger frusto-conical portions 48 are in rolling contact with the internal surface of a governing annulus 58 mounted to slide axially, but not rotate, relative to the housing 10. In fact, in correspondence with its front face, the governing annulus 58 diametrally opposed radial pins 60 with two rollers 62 fitted to the external ends which engage in corresponding axial guide slots 64 formed in the side wall of a hollow cylindrical element 6. The element 66 is, in turn, connected with radial clearance to the side wall of the hollow body 16 by a pair of pins 68 which are diametrally opposed to each other and angularly staggered at 90° relative to the pins 60. The governing annulus 58 thus floats relative to the three planet wheels 46 and is therefore self-centring.

The axial displacement of the governing annulus 58, for reasons specified previously in the specification, is effected by a set of three axial oleodynamic actuators 70 which are angularly equidistant from one another, each comprising a cylinder 72 formed integrally with the element 66 within which is slidable a piston 74 carrying a rod 76. The external end of each rod 76 has a substantially spherical surface which bears against a shallow recess with a complementary spherical surface 78 formed in the rear major face of the governing annulus 58. Three axial return members 80, which are angularly equidistant from one another and staggered angularly relative to the oleodynamic actuators 70, operate on the opposite major face of the annulus 58. Each of the return members 80 comprises a socket element 82, the bottom of which has a projection with a substantially spherical surface 86 which, by means of a helical spring 88, presses against a corresponding recess with a complementary spherical surface 84 in the annulus 58.

The smaller frusto-conical portions 50 of the three tapered planet wheels 46 bear against a complementary conical internal surface 90 of a driven annulus 92 which is formed integrally with a wheel 94 which rotates coaxially with the drive shaft 28. The wheel 94 is supported for rotation by the tubular projection 18 of the body 16 by means of a taper roller bearing 96, and is fitted with an externally-toothed crown wheel 98 which meshes with a cylindrical gear wheel 100 carries by a driven shaft 102 parallel to the input shaft 20. The internal end of the driven shaft 102 is supported for rotation by a tubular projection 104 of the body 16 with the interpositioning of a rolling bearing 106, whilst its external end passes through an opening in the rear plate 14, which supports it for rotation by means of a rolling bearing 108, in order to transmit the drive to a differential unit of the motor vehicle.

Figure 4:
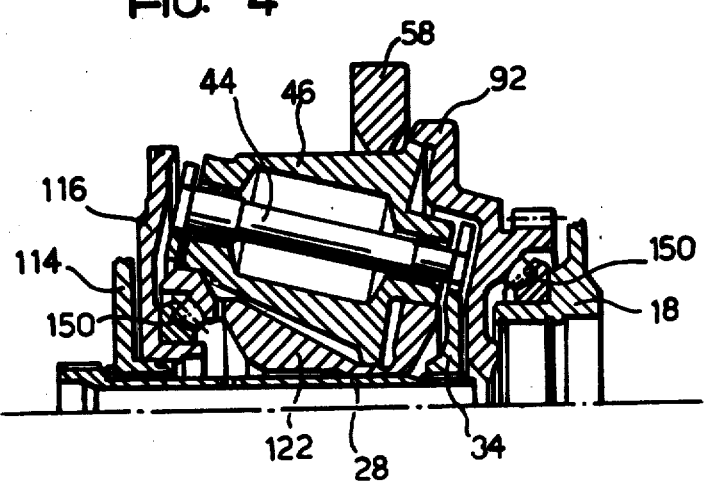
FIG. 4 is a variant of the detail shown in FIG. 3.

The contact pressure between the smaller frusto-conical portions 50 of the planet wheels 46 and the conical surface 90 of the driven annulus 92, and between larger frusto-conical portions 48 of the planet wheels 46 and the internal surface of the governing annulus 58, is supplied by an oleodynamic actuator, generally indicated 112. This actuator 112 is formed by an annular cup-shaped element 114 carried on the housing 10 coaxial with the drive shaft 28 and with its cavity facing the front disc 40 of the planet carrier 34. An annular piston 116 is mounted in the cavity of the element 114 for axial sealed sliding under the action of a Belleville washer 118 which tends to press it axially towards the planet carrier 34. The annular piston 116 has a hub 120 which partly surrounds the drive shaft 28 and against which bears a freely-rotatable sun wheel in the form of a sleeve 122 coaxial with the drive shaft 28. Between the hub 120 of the piston 116 and the sun wheel sleeve 122 are placed a radial ball bearing 124 an an axial bearing 126. The axial bearing 126 is formed by two rings of straight rollers 128 placed between an internal centre plate 130 and a first external bearing block 132 and a second external bearing block 134, respectively, which rest against two annular shoulders of the hub 120 and the sun wheel sleeve 122 respectively. According to a variant illustrated in FIG. 4, the bearing 96 and the bearing 124, 126 are preferably replaced by a pair of axially orientable roller bearings 150.

The sun wheel sleeve 122 has two external bearing surfaces 136, 138 in correspondence with its ends, which are in rolling contact with the external surfaces of the terminal tangs 52, 54 of the three tapered planet wheels 46. The bearing surfaces 136, 138 are conical surfaces whose generatrices are coincident with those of the conical surfaces of the tangs 52, 54 and therefore converge, as shown in FIG. 3, towards the point C defined above.

The above-described shape of the sun wheel sleeve 122 facilitates a considerable reduction in the loads which bear on the bearing 56 of the tapered planet wheels 46, enabling an appreciable reduction in the hertzian pressures in the areas of contact with the planet wheels 46, and the elimination of any dissipative spin phenomena.

The operation of the transmission described above is epicyclic. Indeed, when the rotation of the input shaft 20 is transmitted through the friction clutch 32 to the drive shaft 28 and thence to the planet carrier 34, the tapered planet wheels 46 are rotated so that the larger frusto-conical portions 48 roll on the governing annulus 58 and the external surfaces of the tangs 52, 54 roll on the sun wheel sleeve 122, transmitting the motion to the driven annulus 92 and thence to the driven shaft 10. The axial position of the governing annulus 58 determines whether the driven shaft 102 rotates in the same direction as the drive shaft 28, in the opposite direction, or not at all. Indeed, when the planet carrier 34 is considered as an input element and the governing annulus 92 as an output element, the transmission described above facilitates a range of ratios $$T = r/(r-1)$$

where $r = R_{s1} R_{c2}/R_{c1} R_{s2}$, in which $R_{s1}$, $R_{s2}$ and $R_{c1}$, $R_{c2}$ are the radii shown in FIG. 3.

When r is greater than 1, the driven shaft 102 rotates in the same direction as the drive shaft 28, whilst when r is less than 1 it rotates in the opposite direction. When r is equal to 1 the driven shaft is stationary.

The operation of the piston 116 of the oleodynamic actuator 112 is such that the value of the contact pressure between the tapered planet wheels 46 and the driven annulus 92 varies as a function of the values of the torque to be transmitted. The intervention of the actuator 112 may be controlled automatically, using an electronic control unit, for example, so that it can compensate for the overloading which occurs in the contact area between the rotating members of the transmission as a result of centrifugal force.

In order to ensure that the transmission operates with kinematic precision, and to eliminate the negative effects that arise from operational tolerances, clearances in assembly, and yielding under load, the epicylcic unit of the transmission according to the invention is completely self-centring. The self-centring is made possible by the above-described assembly of the governing annulus 58 and the planet wheels 46 in relation to the planet carrier 38, and by the particular curvature of the mutually-contacting surfaces of the planet wheels 46 with the governing annulus 58 and the driven annulus 92. In fact, these surfaces are slightly convex, as are the bearing surfaces between the actuators 70,80 and the governing annulus 58, between the sun wheel sleeve 22 and the hub support bearings 120, and between the piston 116 and the element 114 of the oleodynamic actuator 112.

Moreover, when the operation of the transmission is based on the elastohydrodynamic theory of lubrication, utilizing the shearing strength of the lubricant film between the surfaces of rolling contact, it is essential to ensure that lubrication is correct and constant. The transmission according to the invention has a special lubrication system capable of ensuring that lubricant is supplied constantly to the contact area at the correct pressures under all operational conditions, without having to ensure a large quantity of lubricating oil within the housing 10, by avoiding even partial immersion of the rotating parts of the transmission in the lubricant and the resultant increase in dissipative losses. This system includes, among other things, an inlet union 140 for the lubricant connected by a telescopic pipe 142, to an annular pipeline 144 which is fitted to the front face of the governing annulus 58 and has a plurality of holes in its wall through which the lubricant is sprayed into the contact areas between the planet wheels 46 and the governing annulus 58. The lubricant is supplied by another inlet union 146 to the cavity of the input shaft 20 and thence, by a series of radial openings (not illustrated) in the wall of the shaft 20, to the contact areas between the planet wheels 46 and the driven annulus 92. The same lubricant is used both to lubricate the bearings 124, 134, and as an operating fluid for the hydraulic actuators 70 which displace the governing annulus 58, as well as an operating fluid for the oleodynamic actuator 112. In the latter case, the lubricant is fed into the cavity of the element 114 by an inlet union 148.

What is claimed is:

1. An epicyclic transmission with steplessly-variable speed control including:
   a housing;
   a drive shaft extending within said housing;
   a driven shaft extending within said housing;
   a planet carrier in said housing and mounted on said drive shaft for rotation by the latter;
   a plurality of planet wheels in the form of tapered rollers which are supported for rotation by said planet carrier and are spaced angularly from one another about the axis of rotation of said planet carrier, said planet wheels having a larger frusto-conical portion and a smaller frusto-conical portion adjacent the larger base of the larger frusto-conical portion, whereby the radially external generatrices of said larger frusto-conical portions extend substantially parallel to the axis of rotation of said planet carrier;
   respective rolling bearings which support said planet wheels for rotation on said planet carrier;
   a governing annulus locked for rotation with said housing and having its internal surface in rolling contact with the surfaces of said larger frusto-conical portions of said planet wheels;
   adjustment means for axial displacement of said governing annulus along said larger frusto-conical portions of said planet wheels;
   a driven annulus rotatable coaxially with said planet carrier for rotating said driven shaft, said annulus having an internal conical surface complementary to the surfaces of said smaller frusto-conical portions of said planet wheels, and
   means for pressing together in pressure contact the surface of said smaller frusto-conical portions of said planet wheels and said complementary conical surface of said driven annulus, and the surfaces of said larger frusto-conical portions of said planet wheels and the internal surface of said governing annulus,
   the improvement comprising said transmission further including a freely-rotatable sun wheel in the form of a sleeve which is coaxial with said planet carrier and has two axially spaced bearing surfaces, and each said planet wheel having two bearing surfaces which are complementary with said axially spaced bearing surfaces and are in rolling contact therewith, and
   wherein said means for pressing together in pressure contact said smaller frusto-conical portions of said planet wheels and said complementary conical surface of said driven annulus, and said larger frusto-conical portions of said planet wheels and said internal surface of said governing annulus, include an oleodynamic actuator.

2. A transmission as defined in claim 1, wherein the area of said rolling contact between said two bearing surfaces of said sun wheel sleeve and said two complementary bearing surfaces of each said planet wheel are arranged on common conical generatrices which converge substantially towards the point of intersection of the axis of rotation of said planet wheel on the axis of rotation of said planet carrier.

3. A transmission as defined in claim 1, wherein said planet carrier and said sun wheel sleeve are axially slidably mounted on said drive shaft, and said oleodynamic actuator operates in such a manner that it presses said sun wheel sleeve axially towards said driven annulus.

4. A transmsission as defined in claim 3, wherein said oleodynamic actuator includes an annular piston which is coaxial with said drive shaft and faces the smaller bases of said larger frusto-conical portions of said planet wheels; a central hub of said piston, and rolling bearings interposed between said hub and said sun wheel sleeve to support the latter for rotation.

5. A transmission as defined in claim 4, wherein said rolling bearings comprise a radial bearing and an axial bearing, said axial bearing comprising an internal centre plate, a first bearing block which bears against said piston hub, a second bearing block which bears against said sun wheel sleeve, and respective rings of straight rollers between said centre plate and said bearing blocks.

6. A transmission as defined in claim 4, wherein:
   said planet wheels are freely radially displaceable relative to said planet carrier;
   said governing annulus is supported by said housing so as to be self-centering relative to said planet wheels, and
   the respective surfaces of contact between said planet wheels and said govening annulus and said driven annulus, and the bearing surfaces between said sun wheel sleeve and said rolling bearings between said sun wheel sleeve and said piston, are slightly convex.

7. A transmission as defined in claim 6, wherein: each said planet wheel defines an axial cavity; a respective pin is inserted in each said cavity; respective pairs of radial rolling bearings freely rotatably support each said planet wheel on the respective said pin, and said planet carrier defines respective notches in which the ends of said pins are slidable radially.

8. A transmission as defined in claim 6, wherein it includes an internal tubular body; a pair of coaxial radial pins which fix said body within said housing; a pair of diametrally-opposed axial slots defined by said body and staggered at 90° relative to said pins; a pair of radial pins integral with said governing annulus, and a pair of rollers carried by said pins of said annulus and guided in said axial slots.

9. An epicyclic transmission with steplessly-variable speed control including:
   a housing;
   a drive shaft extending within said housing;
   a driven shaft extending within said housing;
   a planet carrier in said housing and mounted on said drive shaft for rotation by the latter;
   a plurality of planet wheels in the form of tapered rollers which are supported for rotation by said planet carrier and are spaced angularly from one another about the axis of rotation of said planet carrier, said planet wheels having a larger frusto-conical portion and a smaller frusto-conical portion adjacent the larger base of the larger frusto-conical portion, whereby the radially external generatrices of said larger frusto-conical portions extend substantially parallel to the axis of rotation of said planet carrier;

respective rolling bearings which support said planet wheels for rotation on said planet carrier;

a governing annulus locked for rotation with said housing and having its internal surface in rolling contact with the surfaces of said larger frusto-conical portions of said planet wheels;

adjustment means for axial displacement of said governing annulus along said larger frusto-conical portions of said planet wheels;

a driven annulus rotatable coaxially with said planet carrier for rotating said driven shaft, said annulus having an internal conical surface complementary to the surfaces of said smaller frusto-conical portions of said planet wheels, and means for pressing together in pressure contact the surface of said smaller frusto-conical portions of said planet wheels and said complementary conical surface of said driven annulus, and the surfaces of said larger frusto-conical portions of said planet wheels and the internal surface of said governing annulus, the improvement comprising said transmission further including a freely-rotatable sun wheel in the form of a sleeve which is coaxial with said planet carrier and has two axially spaced bearing surfaces, and each said planet wheel having two bearing surfaces which are complementary with said axially spaced bearing surfaces and are in rolling contact therewith, and wherein said adjustment means for axial displacement of said governing annulus include a plurality of oleodynamic actuators.

10. A transmission as defined in claim 9, wherein each said oleodynamic actuator includes a rod having a convex end surface in contact with said governing annulus.

11. A transmission as defined in claim 1 or 9, wherein it further includes lubrication means for continuously supplying a liquid lubricant under pressure to the respective said contact areas between said planet wheels and said governing annulus, said driven annulus and said sun wheel sleeve, and to the respective said rolling bearings between said planet wheels and said planet carrier, and between said sun wheel sleeve and said piston of said oleodymaic actuator.

12. A transmission as defined in claim 11, wherein said lubrication means include an inlet union, a perforated annular pipeline coaxial with said governing annulus, and a telescopic pipe which connects said inlet union with said perforated annular pipeline.

13. A transmission as defined in claim 11, wherein it further includes means for supplying said lubricant liquid to said oleodynamic actuators for operation of the latter.

* * * * *